H. P. HAUSHALTER.
MOTOR VEHICLE.
APPLICATION FILED JULY 22, 1908.

926,411.

Patented June 29, 1909.

2 SHEETS—SHEET 1.

WITNESSES:
O. R. Erwin.
J. Gilbert Erwin.

INVENTOR
Henry P. Haushalter
By Erwin & Wheeler
ATTORNEYS.

H. P. HAUSHALTER.
MOTOR VEHICLE.
APPLICATION FILED JULY 22, 1908.
926,411.
Patented June 29, 1909.
2 SHEETS—SHEET 2.
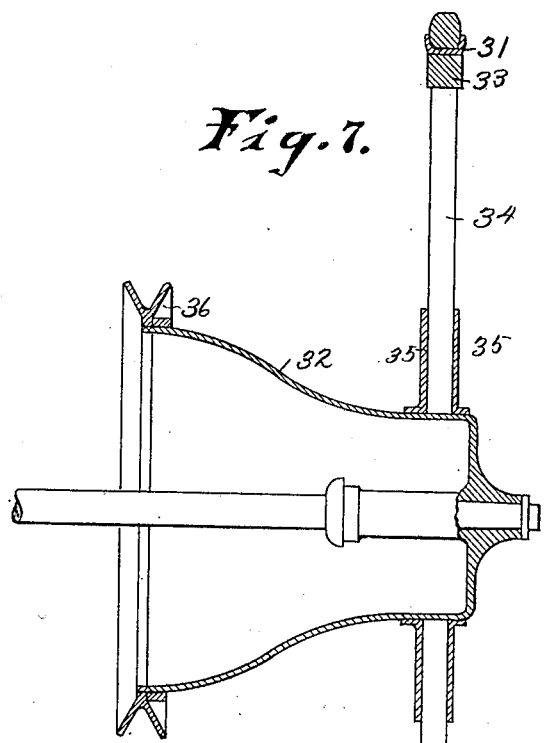
*Fig. 7.*
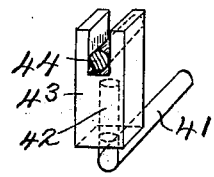
*Fig. 3.*
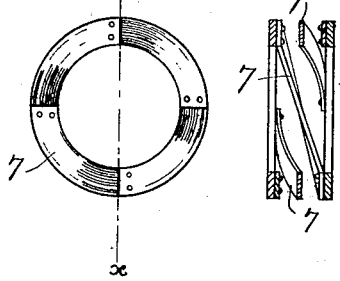
*Fig. 4.  Fig. 5.*
*Fig. 6.*
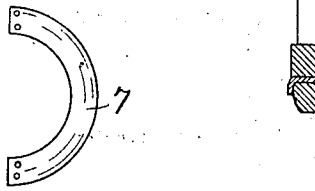
WITNESSES:
O. R. Erwin
J. Gilbert Erwin
INVENTOR
Henry P. Haushalter
By Erwin & Wheeler
ATTORNEYS.

UNITED STATES PATENT OFFICE.

HENRY P. HAUSHALTER, OF MILWAUKEE, WISCONSIN.

MOTOR-VEHICLE.

No. 926,411.　　　Specification of Letters Patent.　　Patented June 29, 1909.

Application filed July 22, 1908.　Serial No. 444,697.

*To all whom it may concern:*

Be it known that I, HENRY P. HAUSHALTER, a citizen of the United States, residing at Milwaukee, county of Milwaukee, and State of Wisconsin, have invented new and useful Improvements in Motor-Vehicles, of which the following is a specification.

My invention relates to improvements in motor vehicles, and it pertains more especially, among other things, first, to the means for yieldingly connecting the steering wheels to their supporting shafts whereby such wheels may turn upon a point in their periphery without sliding as the vehicle is guided toward the right or left from a straight course. Second, to the means for communicating revoluble motion from a common driving shaft to both the front and rear wheels whereby all the wheels of the vehicle are utilized as driving wheels. Third, to the means for communicating motion from an operating lever to the steering wheels in the act of guiding the vehicle.

The construction of my invention is explained by reference to the accompanying drawings in which—

Figure 1:
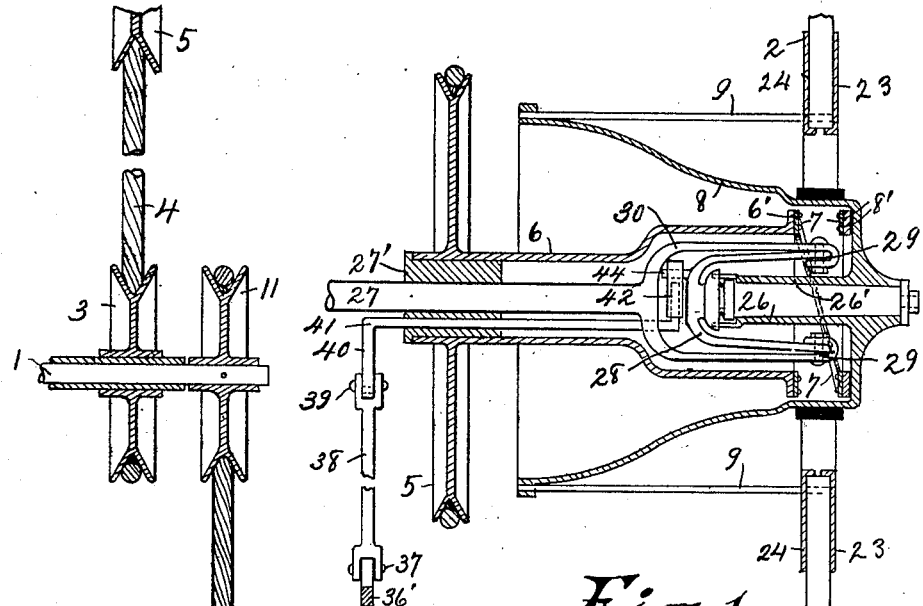
Figure 2:
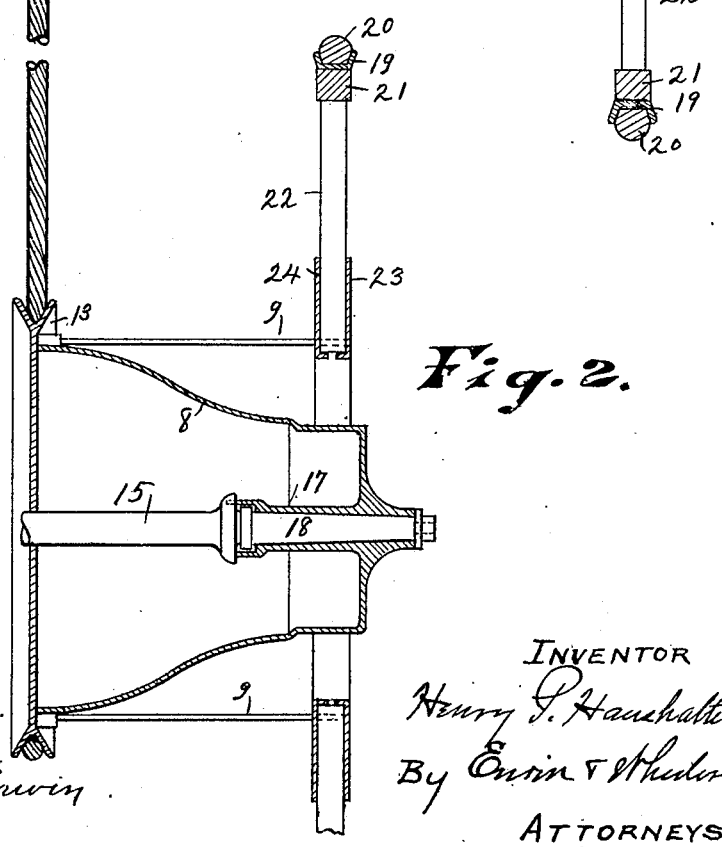

Figure 1 represents a vertical section of one of the vehicle hubs of one of the steering wheels, a portion of the wheel and a band pulley connected with such hub, together with a side view of the wheel supporting shaft and wheel axle. Fig. 2 represents a horizontal section of the rear hub, a portion of the rear wheel, the main driving shaft and bands communicating from the driving shafts to the front and rear wheels. Fig. 3 is a detail in perspective of a part of the steering mechanism. Fig. 4 is a front view and Fig. 5 is a vertical section drawn on line *x—x* of Fig. 4, of the flexible members between the driving and driven members of the hub of one of the steering wheels, which permits the exterior driven member of the hub and wheel to be inclined toward the right and left at an angle to the central driving member of the hub in the act of guiding the vehicle. Fig. 6 is a side view of one of the flexible members removed from its supporting parts; and Fig. 7 is a modified form of wheel in which the spokes of the wheel and the hub are rigidly connected together and the annular series of horizontal spring members, shown in the other form of wheels, dispensed with.

Like parts are identified by the same reference figures throughout the several views.

1 represents a driving shaft to which motion is communicated from any ordinary motor in the ordinary manner. Motion is communicated from the driving shaft 1 to the front or guiding wheels 2 of the vehicle through the pulley 3, driving belt 4, pulley 5, central hub member 6, semi-circular flexible members 7, 7, exterior hub 8 and horizontal flexible members 9, while motion is communicated from said shaft 1 to the rear wheels 10 through the driving pulley 11, belt 12, pulley 13, and an annular series of flexible members 9. The driven pulley 13 is revolubly connected with the shaft 15 through the hollow hub 8, axle hub 17 and journal bearing or wheel axle 18, upon and around which axle 18, said wheel is adapted to revolve.

The wheel proper, as distinguished from the hub, comprises the rim 19, tire 20, a felly 21 for the reception of the outer ends of the several spokes 22 and two annular spoke supporting plates 23 and 24, between which the inner ends of the several spokes are clamped and held in place, it being understood that the hubs 8, flexible members 9, rims, tires, fellies, spokes and spoke retaining plates in both the front and rear wheels of the preferred form are of like construction.

In the preferred form of wheels shown in Figs. 1 and 2, the annular clamping plates 23 and 24 are connected with the hub 8 by an annular series of spring rods 9, by which the body of the vehicle is relieved from the jarring movement which would otherwise be communicated to it from the wheels of the vehicle as the same are being driven over an uneven surface, said series of springs 9 being adapted to permit the wheels to be moved upwardly and downwardly without communicating the usual jarring movement to the hubs or body of the vehicle, whereby the necessity of using pneumatic tires is avoided. The front or guiding wheels of the vehicle are adapted to revolve upon the inclinable wheel axles 26 and said axles 26 are respectively connected with the non-revoluble shaft 27 through the bifurcated arms of the U shaped bracket 28, pivoted bolts 29, 29 and the bifurcated arms of the U shaped bracket 30, the U shaped bracket 28 being rigidly connected with the axle 26 and adapted to be inclined toward the right and left in the act of guiding the vehicle, while the U shaped bracket 30 is rigidly connected with said shaft 27. By this arrangement, the pivotal connections 29, 29, between the stationary shaft 27 and the axle 26 is formed one above another on a line with the vertical center of the wheel, whereby the steering wheels are free to turn upon a point in their peripheries, whereby a minimum power is required in guiding the vehicle.

The hub member 6 is revolubly supported from the shaft 27 upon the stationary journal bearing 27' and a revoluble movement is communicated from such central hub member to the exterior hub member 8 through a plurality of semi-circular springs 7, which springs are respectively connected at one end to said central hub member 6 by rivets 6' and at their opposite ends to the opposing surface of the exterior hubs 8 by rivets 8', whereby the exterior hub members 8 and the wheels supported therefrom are free to be inclined toward the right and left in the act of guiding the vehicle, while the interior or central hub members 6 remain upon the same plane with the supporting shaft 27. The exterior hub members 8 are connected with the wheel axles 26 through the axle hub members 26' which are revolubly supported upon said axle.

In the modified form of wheel shown in Fig. 7, the rim 31 is connected directly with the hollow hub 32 through the felly 33, annular series of spokes 34, and annular plates 35, 35, which annular plates 35, 35, are rigidly connected with said hub 32, while the pulley 36 is also rigidly connected with said hub, and motion is communicated directly from the driving pulley and belt to said hub 32 through the pulley 36 and the annular series of springs shown in Figs. 1 and 2 are dispensed with. In the act of steering the vehicle, motion is communicated from an operating lever 36', pivotal bolt 37, link 38, pivotal bolt 39, arm 40, revoluble steering shaft 41, arm 42, bracket 43, trunnion 44 and U shaped bracket 28. Thus it is obvious that by inclining the lever 36' forwardly and backwardly, the axles 26 may be inclined toward the right and left, whereby the desired movement is communicated through the coöperating parts from said axles 26 to the steering wheels. While the series of springs 9 must be arranged parallel with each other, it is not necessary to the operation of the device that all of said springs should be formed in the same annular series.

While I have shown but one traction and steering wheel in connection with each of the revoluble shafts, it will of course be understood that the opposite ends of each of the non revoluble shafts are in like manner provided with traction and steering wheels and mechanism for guiding the same.

Having thus described my invention what I claim as new and desire to secure by Letters Patent is

1. In driving mechanism for motor vehicles, a device for yieldingly connecting the steering wheels with a motor-driven hub-member consisting in the combination of a non-revoluble shaft, a pair of motor driven hub members revolubly supported from said shaft, a pair of central wheel axles respectively pivotally supported from the ends of said non revoluble shaft, a pair of axle hub members revolubly supported on said wheel axles, a pair of exterior hollow hub members rigidly connected with said axle hub members, a plurality of circular spring members respectively affixed at one end to said motor driven hub members and at their opposite ends to said exterior hub members, a pair of steering wheels, and means for supporting said steering wheels from said exterior hub members.

2. In driving mechanism for motor vehicles, a device for yieldingly connecting the steering wheels with motor driven hub members consisting in the combination of a non-revoluble shaft, a pair of motor driven hub members revolubly supported from said shaft, a pair of central wheel axles respectively pivotally supported from the ends of said non-revoluble shaft, a pair of axle hub members revolubly supported on said wheel axles, a pair of exterior hollow hub members rigidly connected with said axle hub members, a plurality of circular spring members respectively affixed at one end to said motor driven hub members and at their opposite ends to said exterior hub member, a pair of steering wheels, and a plurality of flexible spring members respectively connected at one end to the periphery of said exterior hub members and at their opposite ends to said steering wheels.

3. In driving mechanism for motor vehicles, a device for yieldingly connecting the steering wheels with a motor driven hub member consisting in the combination of a non-revoluble shaft, a pair of motor driven hub members revolubly supported from said shaft, a pair of central wheel axles respectively pivotally supported from the ends of said non-revoluble shaft, a pair of axle hub members revolubly supported on said wheel axles, a pair of exterior hollow hub members rigidly connected with said axle hub members, a plurality of circular spring members respectively affixed at one end to said motor driven hub members and at their opposite ends to said exterior hub member, a pair of steering wheels, means for supporting said steering wheels from said exterior hub members, a manually actuated lever for guiding the vehicle and means for communicating motion from said lever to the wheel axle and steering wheels whereby said wheels may be inclined toward the right and left in guiding the vehicle.

4. In driving mechanism for motor vehicles, the combination of a non-revoluble shaft provided at its respective ends with bifurcated arms, a pair of hollow motor driven hub members revolubly supported from said shaft, a pair of central wheel axles respectively provided at their inner ends with bifurcated arms extending outwardly between the bifurcated arms of said non-revoluble shafts, bolts for pivotally connecting the bifurcated arms of said wheel axles with the respective bifurcated arms of said non-revoluble shaft, a pair of axle hub members revolubly supported upon said wheel axles within said pivotally connected bifurcated arms, a pair of exterior hub members rigidly connected with the outer ends of said axle hub members, a plurality of circular spring members respectively connected at one of their ends to said motor driven hub members and at their opposite ends to said exterior hub members, a pair of steering wheels supported from said exterior hub members in the same vertical plane with the pivotal connection between the bifurcated arms of said non-revoluble shaft, and bifurcated arms of said wheel axle, whereby said steering wheels are adapted to turn on a point in their peripheries on the same vertical line with said pivotal bolts, as said wheels are inclined toward the right and left in the act of steering the vehicle.

5. In driving mechanism for motor vehicles, a device for yieldingly connecting the steering wheels with motor driven hub members consisting in the combination of a non-revoluble shaft, a pair of motor driven hub members revolubly supported from said shaft, a pair of central wheel axles respectively pivotally supported from the ends of said non-revoluble shaft, a pair of axle hub members revolubly supported on said wheel axles, a pair of exterior hollow hub members rigidly connected with said axle hub members, a plurality of circular spring members respectively affixed at one end to said motor driven hub members and at their opposite ends to said exterior hub member, a pair of steering wheels, and a plurality of parallel spring members respectively connected at one end to the periphery of said exterior hub members and at their opposite ends to said steering wheels.

In testimony whereof I affix my signature in the presence of two witnesses.

HENRY P. HAUSHALTER.

Witnesses:
    JAS. B. ERWIN,
    I. D. BREMER.